United States Patent

[11] 3,592,548

[72] Inventor Richard F. Majkowski
Detroit, Mich.
[21] Appl. No. 792,916
[22] Filed Jan. 22, 1969
[45] Patented July 13, 1971
[73] Assignee General Motors Corporation
Detroit, Mich.

[54] HOLOGRAPHIC METHOD OF DIMENSIONAL INSPECTION
10 Claims, 5 Drawing Figs.

[52] U.S. Cl...... 356/71,
350/3.5, 350/162, 356/106, 356/109, 356/167, 356/168
[51] Int. Cl...... G06k 9/08, G01b 9/02, G01b 11/00
[50] Field of Search...... 350/3.5, 162; 356/71, 106, 109, 162—169

[56] References Cited
UNITED STATES PATENTS

| | | | |
|---|---|---|---|
| 2,643,576 | 6/1953 | Merriam | 356/71 |
| 2,886,718 | 5/1959 | Shepherd et al. | 356/169 X |
| 3,054,998 | 9/1962 | Cooper et al. | 356/71 X |
| 3,264,932 | 8/1966 | Hendricks | 356/167 X |
| 3,437,824 | 4/1969 | Lohmann | 356/71 X |
| 3,483,513 | 12/1969 | Burckhardt et al. | 356/71 X |

OTHER REFERENCES

Leith et al., " Investigation of Hologram Techniques," FIRST INTERIM ENGINEERING REPORT, Radar & Optics Lab., Willow Run Lab., Inst. of Science & Tech., University of Michigan, Ann Arbor, 12/65, pp. 5— 12, 356/71.

Ennos, " Holography & Its Applications," CONTEMPORARY PHYSICS, 1967, V. 8, No. 2, pp. 153— 170, 356/71.

Primary Examiner—Ronald L. Wibert
Assistant Examiner—Warren A. Sklar
Attorneys—Jean L. Carpenter, Warren D. Hill and Paul Fitzpatrick ABSTRACT: To dimensionally compare one contour surface with another, one surface is provided with a contrast pattern and a hologram is made of that surface. Then the hologram is reconstructed and the image of the contrast pattern is superposed on the other surface. The contrast pattern will register with the other surface only to the extent that the two surfaces are alike. Where the surfaces are not alike, the amount of the difference is determined by moving the second surface through a measured distance until the pattern is registered with the surface.

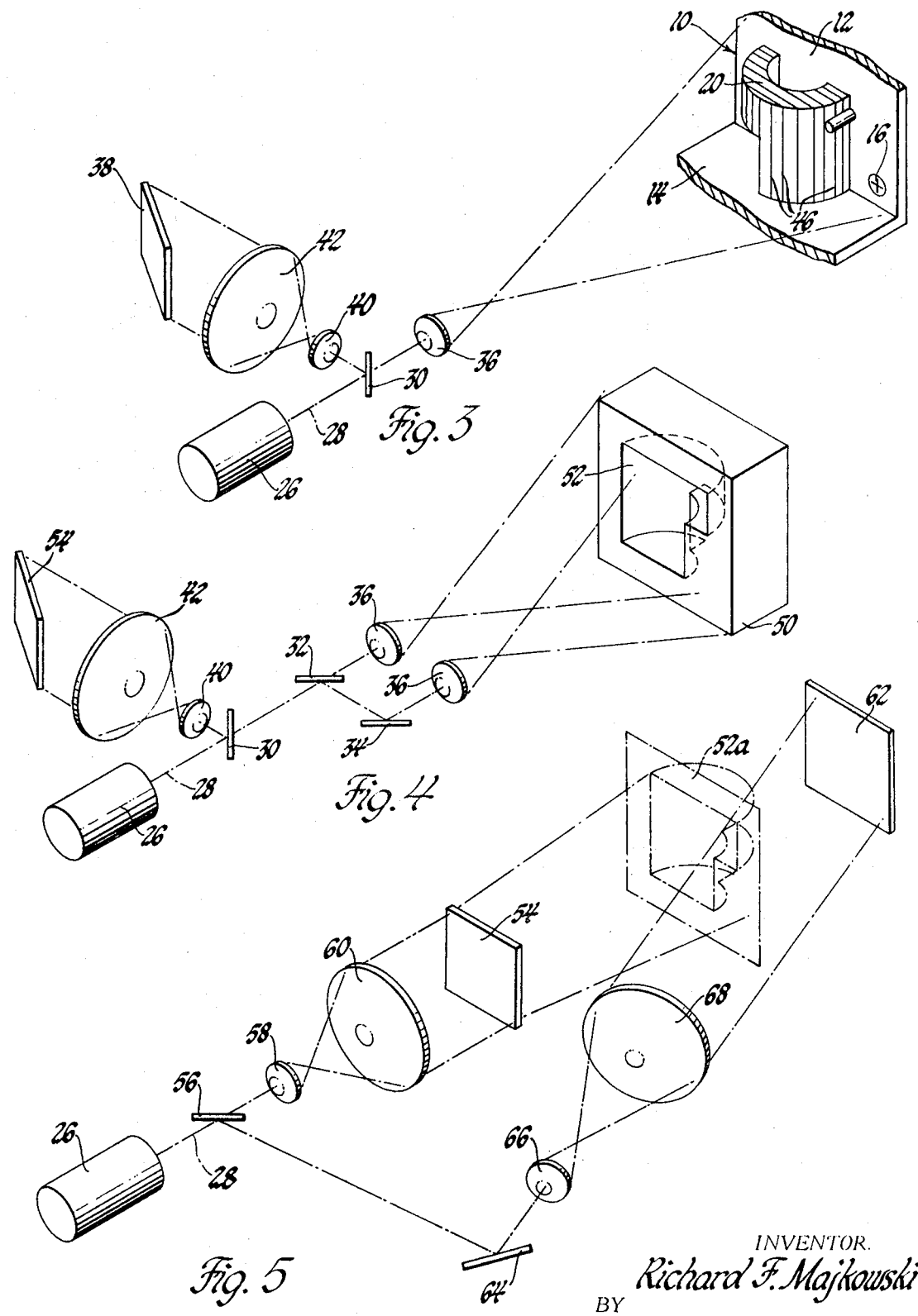

HOLOGRAPHIC METHOD OF DIMENSIONAL INSPECTION

This invention relates to a method of dimensionally comparing a surface of an article with another surface and particularly to such a method which utilizes holography.

It is often required in industrial operations to compare one article with another to determine either qualitatively or quantitatively dimensional differences between the articles. This is required, for example, to compare production parts with standards or to measure die wear. Where the articles to be compared comprise three-dimensionally contoured surfaces of critical dimensions, the task of making a comparison by conventional techniques is often time consuming and difficult. In the case of die wear, in particular, after the die has suffered wear, the original die no longer is available to make a comparison unless a complete stock of master dies is held in reserve for this purpose.

It has been known to use holographic interferometers to measure distortion or displacement of the surface. However, generally that method is practical only for measuring very small dimensional differences in the order of a few wavelengths of light.

It is therefore a general object of this invention to use holography for making a noninterferometric dimensional comparison of one contoured surface with another.

It is a further object of this invention to provide a method of making a dimensional comparison of an article at one point in time with the same article as it existed at an earlier point in time.

It is another object of this invention to provide a method of dimensionally comparing two contoured surfaces at a time when one of the surfaces no longer exists.

The invention is carried out by providing a contrast pattern on the surface of an article, making a hologram of the surface and reconstructing the hologram to form an image in substantial registry with a surface on the same or another article wherein nonregistration of the contrast pattern with the surface is indicative of dimensional differences. If desired, the amount of difference at any point is determined by moving the article through a measured distance until registry is achieved.

The invention is further carried out by providing an article with contrasting interference fringes, making a hologram of the article and reconstructing the hologram so that a real image of the fringes is focused on the surface of another article. To the extent the articles are dimensionally alike, the pattern will be in focus on the surface but will be out of focus where the articles are dimensionally different. The amount of difference at any point is determined by moving the other article until the fringes are in focus at that point and measuring the amount of movement.

The above and other advantages will be made more apparent from the following specification taken in conjunction with the accompanying drawings wherein like reference numerals refer to like parts and wherein:

FIG. 3 is a diagrammatic view of apparatus for carrying out a method according to a third embodiment of the invention, and;

FIGS. 4 and 5 together show a diagrammatic view of apparatus for carrying out a method according to a fourth embodiment of the invention.

Generally the method of this invention is intended to permit the dimensional comparison of one surface with another and, if desired, to permit dimensional measurement of the difference between two surfaces. The method is especially useful for comparison of three-dimensional contoured surfaces which are difficult to compare using conventional methods.

The method comprises first placing a contrast pattern on the surface of an article either by physically marking the article or by projecting a pattern onto the article in coherent light. Then a hologram is made of the surface bearing the contrast pattern. After the hologram is made, it is no longer necessary to retain the article for comparison purposes; hence it may be discarded or consumed for any desired purpose. Then the hologram is reconstructed and either image, real or virtual is aligned with a second article to be compared to the first article. Actually the same article may be compared to itself but at a different point in time to detect changes in the article during the elapsed time for example to measure die wear. The reconstructed image of the article will have the same three-dimensional contour as the original article as well as the same dimensions, provided that a one-to-one size ratio is maintained. Thus when the image is superposed on the second article, the contrast pattern will appear to be in focus on the surface of the second article if the two articles are dimensionally alike, but where the articles have different dimensions, the contrast pattern will appear out of focus. The dimensional difference is measured by moving the hologram or the article until the pattern is in focus at that point and measuring the amount of movement.

Figure 1:
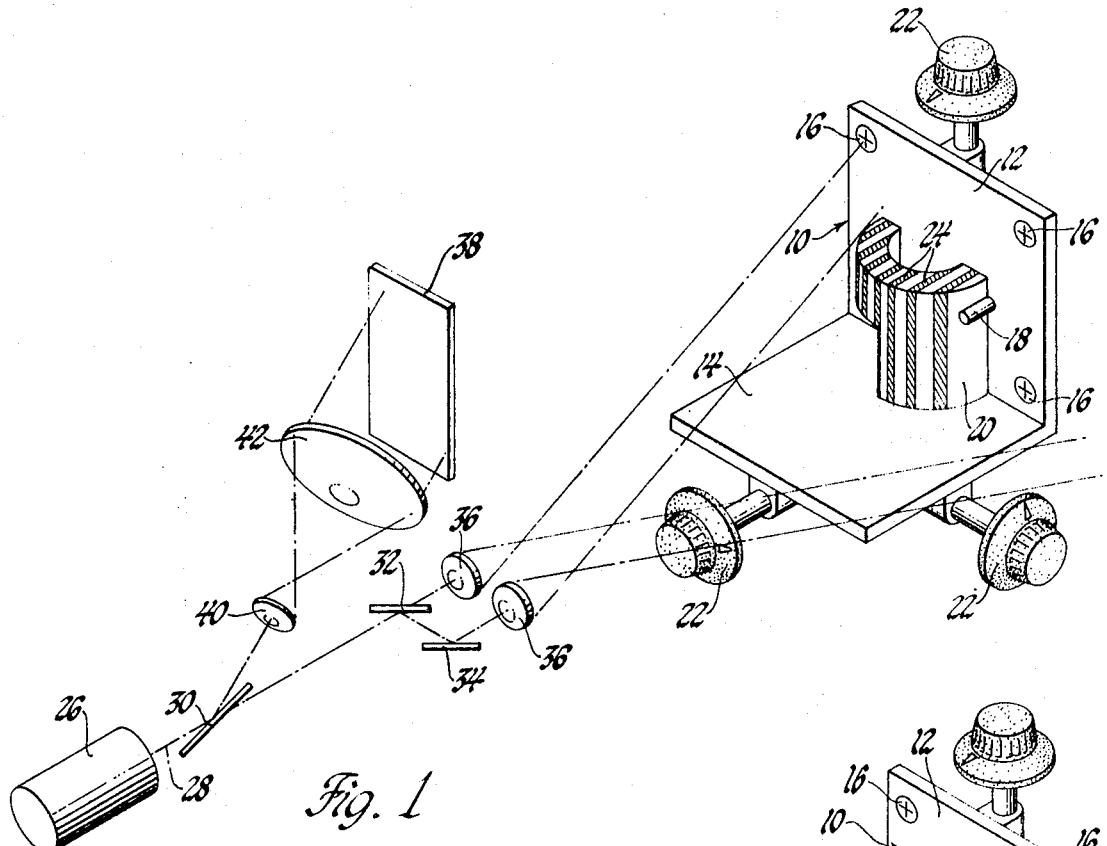
FIG. 1 is a diagrammatic view of apparatus for carrying out a method according to one embodiment of the invention.

As shown in FIG. 1, a fixture 10 includes a vertical reference surface 12 and a horizontal reference surface 14. The vertical reference surface 12 includes three alignment targets 16 and a locating pin 18. A standard or master article 20 is placed on the fixture 10 and is located in a specific orientation by the reference surfaces 14 and 12 and the locating pin 18. Micrometer adjusting knobs 22 are provided to move the fixture 10 along each of three mutually perpendicular axes by a measured amount. A contrast pattern comprising interference fringes 24 is formed on the article 20 by interference of coherent light from two sources. For that purpose, there is provided a laser 26 producing a beam 28 of coherent light, part of which passes through a first beam splitter comprising a partially reflective mirror 30 and to a second beam splitter comprising a partially reflective mirror 32 and a fully reflective mirror 34 arranged to produce two spaced parallel beams, each of which passes through a diverging lens 36 to illuminate the article 20 and produce the interference fringes 24 thereon. The fixture 10 including the alignment targets 16 is also illuminated with interference fringes, however, this is omitted from the drawing for the purpose of clarity. A photographic plate 38 is positioned in front of the fixture 10 in full view of the article 20 and receives light reflected therefrom. A reference beam reflected from the beam splitter 30 passes through a diverging lens 40 and a collimating lens 42 to project a collimated reference beam of coherent light onto the photographic plate 38. In this manner, a photographic plate 38 is exposed and upon development becomes a hologram 38. The hologram 38 thus produced has stored thereon complete information as to the shape and dimensions of the article 20 at least insofar as concerns those portions of the article 20 in view of the photographic plate 38.

Figure 2:
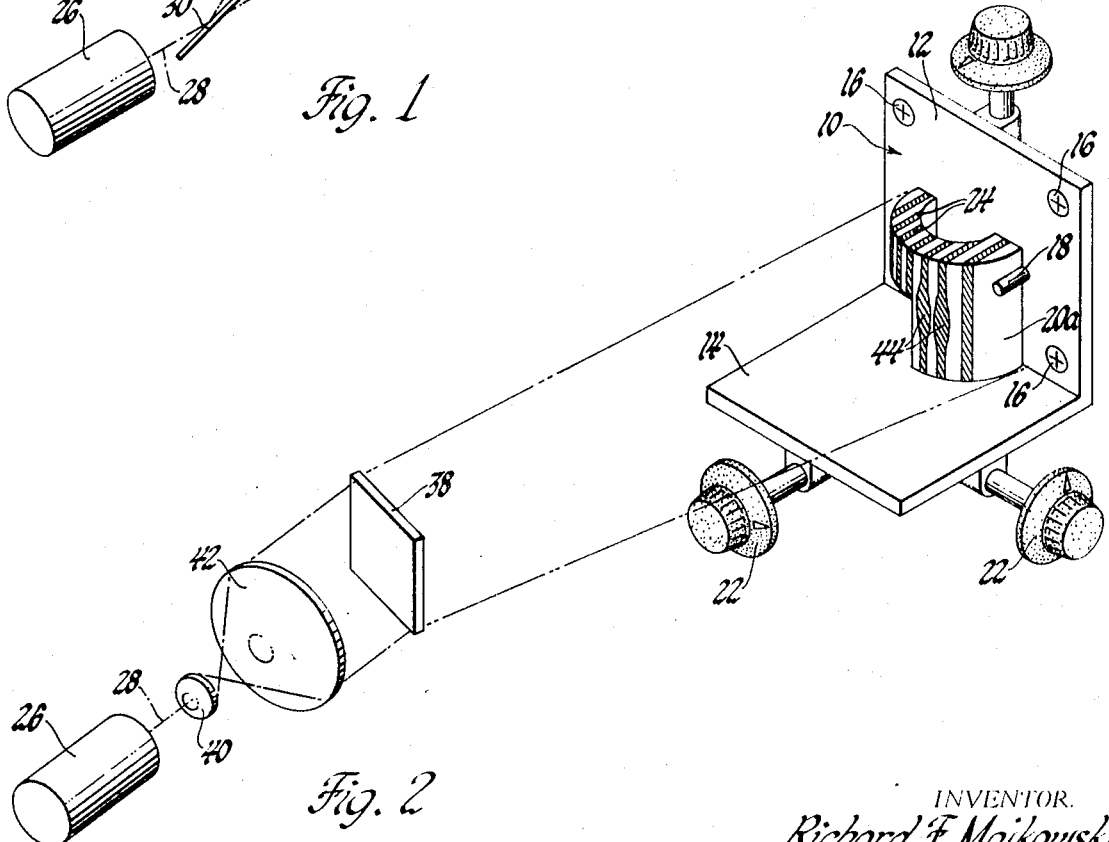
FIG. 2 is a diagrammatic view of apparatus for carrying out a method according to another embodiment of the invention.

Then, as shown in FIG. 2, the article 20 is removed from the fixture 10 and an article 20a is substituted therefor. The article 20a is an article similar to the article 20 which is to be dimensionally compared with article 20 and may be either an entirely different article or the same article after wear or some other agent caused changes in the dimensions thereof. Since the hologram 38 has been prepared for the original article 20, the original article is no longer necessary for the sake of comparison. A real image of the interference fringes 24 is reproduced on the article 20a by reconstructing the hologram. To that end, the laser beam 28 is directed through the diverging lens 40 and the collimating lens 42 onto the hologram 38. If necessary, the system is adjusted until the alignment targets 16 in the image exactly coincide with the same targets 16 on the fixture 10. Then the article 20a will be in the same relative position as the original article 20 and if the articles are identical, the interference fringes 24 will be in focus on the surface of the article 20a. Where, however, the article 20a is dimensionally different from the article 20, the interference fringes will not be in focus and will appear to be fuzzy, as shown at 44 thereby immediately indicating to an inspector or other observer that the articles 20 and 20a differ. The amount of dimensional difference between the articles is measured by manipulating the micrometer adjusting knobs 22 until those portions of interference fringes at 44 come into focus, the amount of dimensional difference being indicated by the amount of movement of the micrometer adjusting knobs 22. The contrast pattern on the article 20a may be inspected with a telescope if that is required for the desired accuracy. The accuracy may be further improved by scanning the pattern with a radiometer to measure the light intensity thereof and to determine the in-focus position. In many cases, the pattern 24 can be scanned by the naked eye and with experience even the amount of dimensional inaccuracy can be judged roughly without making the micrometer adjustment. To this end, the flexibility of the system of FIG. 1 in which the interference fringes 24 produce the contrast pattern is of value because the beam-splitting mirrors 32 and 34 and the lenses 36 may be moved closer together to increase the number of interference lines 24 thereby making the dimensional deviations from standard readily detected. The separation of the fringes 24 then is readily controlled to the required tolerance of the article 20a. Moreover, the depth of focus of the laser optical system can be made less than the required tolerance. For example, if a tolerance of ±0.010 inch is desired, the depth of focus of the optical system can be made small enough that defocus of, say, 0.005 inch could readily be determined. The depth of focus of the system is controlled, of course, by the size of the hologram 38 or other limiting aperture in the system.

The apparatus of FIG. 1 may also be used for inspection of the article 20a. The article 20a is simply substituted for the article 20 and the developed hologram 38 is substituted for the holographic plate 38. Then two sets of interference fringes 24 will appear on the article 20a, one projected from the hologram 38 and the other formed on the article 20a by interference as before. If the two sets of fringes 24 coincide, the articles are identical, but in the event that they are not coincident then this indicates that the article 20a deviates from standard dimensions.

While the method of producing a contrast pattern by interference fringes has a number of advantages as set forth above, other methods of producing a pattern may be used. For example, a grid of lines or an array of dots may be optically produced from a laser beam and projected onto the article 20. Alternatively, a contrast pattern may be physically placed on the surface of the article 20 as by painting, for example. As shown in FIG. 3, the article 20 has a contrast pattern comprising lines 46 painted on the surface. The article 20 and the fixture 10 are illuminated by the beam 28 from the laser 26 which passes through the beam splitter 30 and the diverging lens 36. A reference beam is directed from the beam splitter 30 through the diverging lens 40 and the collimating lens 42 onto the photographic plate 38. Thus, in this arrangement, the reference beam and the light reflected from the article 20 impinge on the same side of the photographic plate 38 to expose the hologram. After development, the hologram 38 may be used in a system like that of FIG. 2 to project the real image of the lines 46 onto the article 20a. In inspecting the article, the same consideration applies as before, i.e., if the lines 46 are in focus on the surface of the article, the article is dimensionally identical to the standard article 20. However, to the extent the lines 46 are not in focus on the surface of the article 20a, then the article 20a does not dimensionally conform to the standard article 20.

It is not essential during inspection of the part that the real image of the contrast pattern be superposed on the article 20a, but rather the virtual image of the contrast pattern may be used regardless of the manner in which the hologram 38 was produced. If the hologram 38 is arranged in the optical system as shown in FIG. 3, the article 20a is substituted for the standard article 20 and the illuminating beam passing through the diverging lens 36 is removed, then the virtual image of the contrast pattern and the alignment target 16 as seen by the observer will appear to lie on article 20a if it dimensionally conforms to the standard article 20. In some circumstances, depending on the nature of the article 20, it is not necessary to use a fixture 10 and alignment target 16. There must be some means to reference the image to the article 20a, however edges or other salient features on the articles 20, 20a may conveniently be used as alignment targets. For example in a die, portions which are not subject to wear could provide suitable alignment targets during die wear inspection.

A modification of the method described herein may be used to compare articles which are not identical but which are complementary in shape and therefore have similar surface contours and dimensions. Thus, a standard article 20 having generally convex contour may be compared with a complementary article such as a die having a concave contour. This permits comparison of a die configuration with a standard article 20 representing the parts to be made from the die. Fig. 4 illustrates a die 50 having a concave surface 52 which is substantially the complement of the surface of the standard article 20. The contoured surface 52 is illuminated with interference fringes, not shown, by a laser beam 28 and an optical system like that described with reference to FIG. 1 and similarly, a photographic plate 54 is illuminated by a reference beam from the beam splitter 30 and the lenses 40 and 42. Thus, a hologram 54 of the contoured surface 52 is exposed. After development, as shown in FIG. 5, the hologram 54 is reconstructed by a laser beam passing through a beam splitter 56, a diverging lens 58 and a collimating lens 60 to produce a real image 52a of contoured surface 52. A second photographic plate 62 is placed in view of the real image 52a on the convex side thereof. The photographic plate 62 is thus illuminated by the real image 52a as well as a reference beam derived from the laser 26 and transmitted by the beam splitter 56, a mirror 64, a diverging lens 66 and a collimating lens 68. Thus, the photographic plate 62 becomes a hologram of the image 52a. However, upon reconstruction of the hologram 62, an inverted image relative to the original contour 52 is formed. This inverted image then is like the standard article 20 and may be compared thereto by the systems shown in FIGS. 1, 2 or 3, thereby enabling the dimensional comparison of the contour 52 to the surface of the standard article 20.

I claim:

1. A method of dimensionally comparing one contoured surface with another approximately similar contoured surface comprising the steps of forming a contrast pattern on one of the surfaces, making a hologram of the contrast pattern and the one surface, optically reconstructing the hologram to produce an image of the contrast pattern and the one surface, superposing the image of the contrast pattern and the one surface on the other contoured surface so that to the extent the contoured surfaces are dimensionally alike the contrast pattern will register with the other contoured surface and to the extent the surfaces are dimensionally different the contrast pattern will not register with the other surface, and determining from the pattern the difference between the one contoured surface and the other contoured surface.

2. A method of dimensionally comparing a standard article with a test article comprising the steps of forming a contrast pattern on one of the articles making a hologram of the contrast pattern and the one article, optically reconstructing the hologram to produce an image of the contrast pattern and the one article, superposing the image on the other of the articles so that if the other article is dimensionally like the said one article the contrast pattern will register with the surface of the other article and to the extent that the articles are dimensionally different the contrast pattern will not register with the surface of the other article, and determining from the pattern the difference between the one article and the other article.

3. A method of dimensionally comparing a standard article with a test article comprising the steps of forming a contrast pattern on one of the articles, making a hologram of the said contrast pattern and said one article, projecting a real image of the said contrast pattern and said one article onto the other of the articles by directing a beam of coherent light through the hologram onto the said other article so that if the other article is dimensionally like the said one article, the contrast pattern will be in focus on the said other article and to the extent that the articles are dimensionally different the contrast pattern will be out of focus, and determining from the pattern the difference between the one article and the other article.

4. A method of dimensionally comparing a standard article with a test article comprising the steps of forming a contrast pattern on one of the articles, making a hologram of the said contrast pattern and said one article, projecting a real image of the said contrast pattern and said one article onto the other of the articles by directing a beam of coherent light through the hologram onto the said other article so that if the other article is dimensionally like the said one article, the contrast pattern will be in focus on the said other article and to the extent that the articles are dimensionally different the contrast pattern will be out of focus, and measuring the amount of dimensional difference at any point by moving the other article until the contrast pattern is in focus at that point and measuring the amount of movement.

5. A method of dimensionally comparing a standard article with a test article comprising the steps of forming on one of the articles a contrast pattern in light originating from a coherent light source, making a hologram of the contrast pattern and said one article by exposing a photographic plate to the contrast pattern and said one article and to the coherent light source simultaneously and developing the photographic plate, optically reconstructing the hologram to produce an image of the contrast pattern and said one article, superposing the image on the other of the articles so that to the extent the other article is dimensionally like the said one article the contrast pattern will register with the surface of the other article and to the extent that the articles are dimensionally different the contrast pattern will not register with the surface of the other article, and determining from the pattern the difference between the one article and the other article.

6. A method of dimensionally comparing a standard article with a test article comprising the steps of forming on one of the articles a contrast pattern in light originating from a coherent light source, making a hologram of the contrast pattern and said one article by exposing a photographic plate to the contrast pattern and said one article and to the coherent light source simultaneously and developing the photographic plate, optically reconstructing the hologram to produce an image of the contrast pattern and said one article, superposing the image on the other of the articles so that to the extent the other article is dimensionally like the said one article the contrast pattern will register with the surface of the other article and to the extent that the articles are dimensionally different the contrast pattern will not register with the surface of the other article, and measuring the amount of dimensional difference at any point by moving the other article until the contrast pattern registers with the other article at that point and measuring the amount of movement.

7. A method of dimensionally comparing a standard article with a test article comprising the steps of forming on one of the articles a first contrast pattern in light originating from a coherent light source, making a hologram of the first contrast pattern and said one article by exposing a photographic plate to the first contrast pattern and said one article and to the coherent light source simultaneously and developing the photographic plate, forming on the other of the articles a second contrast pattern like the first contrast pattern, optically reconstructing the hologram to produce an image of the first contrast pattern and said one article, superposing the image on the other of the articles so that to the extent the other article is dimensionally like the said one image of the first article the contrast pattern will register with the second contrast pattern on the other article and to the extent that the articles are dimensionally different the first contrast pattern will not register with the second contrast pattern, and comparing the contrast patterns to determine the difference in the articles.

8. A method of comparing a first article with a second article, each of the articles having a three-dimensional surface contour and the contour of the first article being a substantial complement of the contour of the second article, comprising the steps of forming a contrast pattern on the first article, making a first hologram of the contrast pattern and the first article, optically reconstructing the first hologram to provide a real image of the contrast pattern and the first article, producing an inverted image of the contrast pattern and the first article by making a second hologram of the real image and optically reconstructing the second hologram, superposing the inverted image on the second article so that if the surface contours of the articles are dimensionally alike the inverted image will register with the surface of the second article and to the extent that the surface contours of the articles are dimensionally different the inverted image will not register with the surface of the second article, and determining from the inverted image the difference between the first and second articles.

9. A method of dimensionally comparing the surface of a contoured article with the surface of the same article as it originally existed at a prior time to determine dimensional changes in the article during the lapsed time comprising the steps of forming a contrast pattern on the surface of the original article, making a hologram of the contrast pattern and the surface of the original article, then after a period of time optically reconstructing the hologram to produce an image of the contrast pattern and the surface of the original article, superposing the image on the surface of the article so that to the extent that article has not dimensionally changed the contrast pattern will register with the surface of the article and to the extent that the article has changed the contrast pattern will not register with the surface of the article, and determining from the image dimensional changes in the article surface.

10. A method of dimensionally comparing the surface of a contoured article with the surface of the same article as it originally existed at a prior time to determine dimensional changes in the article during the lapsed time comprising the steps of forming a contrast pattern on the surface of the original article, making a hologram of the contrast pattern and the surface, then after a period of time optically reconstructing the hologram to produce an image of the contrast pattern and the surface, superposing the image on the surface of the article so that to the extent that article has not dimensionally changed the contrast pattern will register with the surface of the article and to the extent that the article has changed the contrast pattern will not register with the surface of the article, and measuring the amount of dimensional change at any point by moving the article until the contrast pattern registers with the surface of the article at that point and measuring the amount of movement.